United States Patent Office 3,451,806

Patented June 24, 1969

3,451,806

PROCESS FOR THE SECONDARY PRODUCTION OF LEAD

Leonard L. Cogen, Newark, and William J. Koepplin, Summit, N.J., assignors to Union Carbide Corporation, a corporation of New York No Drawing. Filed July 8, 1966, Ser. No. 563,700

Int. Cl. C22b *13/02, 7/00*

U.S. Cl. 75—63 6 Claims

ABSTRACT OF THE DISCLOSURE

A method for controlling the operation of a secondary lead blast furnace by maintaining the $CO/CO_2$ ratio in the top gases within the range of 0.15 to 0.30 by adjusting the relative proportions of the charge materials and/or the degree of oxygen enrichment in the blast to the furnace.

This invention relates to a shaft-type furnace process for the secondary production of lead from a charge consisting of lead-bearing materials, fluxing materials, coke and ferrous bearing materials.

Secondary production of lead is lead produced primarily from lead scrap, and is contrasted with primary lead production wherein sintered lead-bearing concentrates having relatively uniform composition are smelted to produce lead bullion. Because the raw materials used in primary lead production processes have relatively uniform composition, the art has been able to maintain high production rates while producing high quality products.

In the secondary lead producing process, the raw lead-bearing material is usually lead scrap, such as scrap battery plates, containing varying amounts of contaminants which must be removed during smelting. The varying composition of the lead scrap renders the process difficult to control on a high production basis because it does not permit accurate advance prediction of the proportions of materials needed to make up the charge.

Conventional shaft-type furnace methods for secondary lead production consists of feeding incremental charges of battery scrap lead, limestone, sand, scrap iron, re-run drosses, slags, and coke into the top of a shaft-type furnace.

A typical incremental charge may consist of 8 lbs. of scrap iron, 6 lbs. of limestone, 200 lbs. of battery plates, 12 lbs. of coke, 6 lbs. of sand and 20 lbs. of re-run slag. During the course of one days production, several hundred incremental charges may be charged into the furnace. As each charge descends through the shaft it is transformed by chemical reactions and physical changes into lead bullion, matte, slag and gases.

As the charge descends, it passes through four zones. There is, however, no sharp demarcation between zones, since a reaction which begins in one zone may not be completed until it reaches another. In the first vertical zone adjacent the top of the shaft, the charge is heated to a temperature between 212° F. and 750° F. wherein it surrenders its hydroscopic water content. The second vertical zone which the charge enters as it descends is commonly known in the art as the "upper zone of reduction." This zone is usually maintained at a temperature between 750° F. and 1300° F. In this zone, the carbonates and sulfates in the charge begin to dissociate.

The heated carbon monoxide gas produced begins to reduce the lead oxide present to lead, which trickles to the lower portions of the furnace. Lead sulfate present in the charge is also partially reduced in this zone to lead sulfide. Additional reduction of lead oxide and lead sulfate by the hot carbon present also occurs. To a limited extent, reaction between lead oxide and lead sulfide also takes place within this zone, yielding lead and sulfur dioxide gas.

The third vertical zone, known as the "lower zone of reduction" is usually maintained at a temperature of the order of 1300° F.–1650° F. In this zone, the dissociation of the carbonates and sulfates is usually completed. Also, in this zone the effect of carbon as a reducing agent becomes more marked than that of carbon monoxide, in producing lead oxide and lead sulfide. The scrap iron in the charge begins to decompose the lead sulfide in this zone to produce a refined lead which trickles to the bottom of the shaft, from which it is continuously tapped.

In the fourth and lowest zone, commonly known as the "zone of fusion," the oxide reductions and sulfide decomposition are completed. The temperature in this zone is usually maintained between about 1300° F. and 2200° F. The lead which has been melted or reduced in the upper zones within the shaft, trickles down to join the lead and matte in the lower portions of the shaft, whereupon the lead, matte and slag settle out in layers according to the density of each; the lead at the bottom, slag at the top and matte in between. The final lead product is continuously tapped from the furnace, whereas the slag is usually tapped intermittently.

A key component of the charge which must be supplied in closely controlled additions is scrap iron. The function of the iron is to remove sulfur from the lead product in the lower zones of the shaft and to prevent the formation of lead-rich slag. An insufficient amount of iron in the charge generally results in a low lead yield, whereas an excess of iron in the charge generally renders the slag viscous and difficult to tap, thereby lowering the overall lead production rate.

The present practice of adjusting the iron content of the charge is by visual inspection of the lead within the well of the furnace, and by inspection of the general slag viscosity conditions. If the well appears dirty, it generally signals the need for more iron, since the dirty appearance often indicates a high sulfur condition. On the other hand, a very viscous slag and lower production rate usually indicate that too much iron is present in the charge.

A basic and undesirable operating characteristic of these prior art processes is that the effect of a given charge addition does not have an effect upon the system until hours afterwards, because of the series of reactions which must take place as the charge slowly descends through the several zones within the shaft. Therefore, if charge additions are made which contain an incorrect proportion of a given material, the detrimental effects thereof result a substantial time later. Moreover, it requires additional time to correct the condition by a compensating change in charge make-up. This type of "flywheel" effect is responsible in large part for the production of off-grade material and consequently substantially lower than capacity furnace production rates of refined lead product.

It is an object of this invention to provide an improved process for the secondary production of lead, wherein near-peak production rates and high product yield can be maintained for a given furnace, even though the proportions and amounts of impurities in the charged materials vary throughout the production period.

Another object of this invention is to provide a dependable method of rapidly detecting the need for a greater or lesser proportion of one or more charge materials in order to maintain high production rates and product yield.

It is yet another object of this invention to provide a method for determining within close limits, the incremental additions of scrap iron required for obtaining a high product yield and production rate in the secondary production of lead.

Other objects and advantages of the invention will become apparent from the following disclosure and appended claims.

According to the present invention, near peak production rates and high yields can be achieved and maintained for a shaft-type furnace process for the secondary production of lead from a charge consisting of lead bearing materials, fluxing materials, carbonaceous fuel, e.g. coke, and ferrous bearing material, wherein an oxidizing gas is reacted with the carbonaceous fuel to liberate the heat required in the process to melt and cause chemical reactions to take place among the charged materials. This is accomplished by measuring the relative amounts of carbon monoxide and carbon dioxide present in the exhaust gases liberated during such process, and thereafter regulating the proportion of the charge materials in such manner as to maintain the ratio of carbon monoxide to carbon dioxide in the exhaust gases within the range of 0.15 to 0.30, and more preferably, within the range of 0.20 to 0.25.

To maintain the above-mentioned ratio within the specified range, according to one aspect of the invention, additional ferrous bearing material is added to the charge whenever the ratio of CO to $CO_2$ falls below the low point of the desired range, and the amount of ferrous bearing material supplied to the charge is reduced whenever the ratio rises above the high point of the range.

Whenever a substantial adjustment in the carbon monoxide-carbon dioxide ratio is required, it is preferably made by controlling the amount of ferrous material added to the charge, since a relatively small amount of ferrous material will cause a substantial change in the ratio.

According to another aspect of the invention, and in order to obtain finer control of the CO to $CO_2$ ratio within the desired range, the oxidizing gas (ordinarily air) reacted with the charge is enriched with oxygen. The percentage of oxygen enrichment is increased whenever the ratio of CO to $CO_2$ exceeds 0.30 and reduced whenever the ratio decreases below 0.15. A change in the oxygen enrichment level acts as a fine control of the ratio, enabling it to be maintained within a small range.

Since a substantial change in the oxygen enrichment level will only produce a small change in the carbon monoxide-carbon dioxide ratio, it is a very effective means of achieving fine control whereby it is possible to maintain the ratio within the preferred operating range of 0.20 to 0.25.

The use of changes in the ferrous scrap level and oxygen enrichment level can be utilized advantageously in combination, particularly in instances wherein the carbon monoxide-carbon dioxide ratio has drifted substantially above or below the range of 0.15–0.30. In such cases a small change in ferrous material addition can be made to bring the ratio close to or within the specified range, and closer control of the ratio to bring it either within the range of 0.15–0.30 or within the preferred area of 0.20–0.25, can thereafter be accomplished by a change in the oxygen enrichment level.

The invention will now be further described with reference to the following specific examples.

Example I

A secondary lead blast furnace having an internal diameter of 36 inches at tuyere level was charged with charge increments, each consisting of the following ingredients:

| | Lbs. |
|---|---|
| Scrap iron | 65 |
| Coke | 50 |
| Stack dust (approx. 60% lead) | 145 |
| Battery plates | 430 |
| Reverberatory slag | 145 |
| Dross | 210 |
| Rerun slag | 70 |
| | [1] 1,000 |

[1] Exclusive of coke and scrap iron.

650 c.f.m. of blast air was supplied through 12 tuyeres, each having a diameter of 2½ inches, and spaced equally about the circumference of the furnace. Lead bullion was continuously tapped, while slag was tapped intermittently.

The carbon monoxide and carbon dioxide content of the exhaust gases was checked throughout the production period, and a correlation made between the $CO/CO_2$ ratio and the production rate. The data taken was as follows:

| Time | $CO/CO_2$ ratio | Production period | Lead output (tons) |
|---|---|---|---|
| 9:00 a.m. | 0.42 | 8:00 a.m.–10:00 a.m. | 3.8 |
| 11:00 a.m. | 0.22 | 10:00 a.m.–12 noon | 4.2 |
| 1:00 p.m. | 0.23 | 12:00 p.m.–2:00 p.m. | 5.9 |
| 3:00 p.m. | 0.57 | 2:00 p.m.–4:00 p.m. | 3.2 |

The above data demonstrates that higher production and better yields can be achieved by regulating the charge ingredients in order to maintain the $CO/CO_2$ ratio in the exhaust gases within close limits. The data also demonstrates that the $CO/CO_2$ ratio of the exhaust gases is an effective indicator of production rate and yield variations which will occur subsequently to the time of measurement of the CO and $CO_2$ in the exhaust gases. The high $CO/CO_2$ ratios at 9:00 A.M. and 3:00 P.M. indicated the presence of too much iron in the system.

Example II

A secondary lead blast furnace having an internal diameter of 30 inches at tuyere level was charged with charge increments having the following ingredients:

| | Lbs. |
|---|---|
| Coke | 50 |
| Scrap iron | 65 |
| Stack dust (approx. 60% lead) | 145 |
| Battery plates | 430 |
| Reverberatory slag | 145 |
| Dross | 210 |
| Rerun slag | 70 |
| | [1] 1,000 |

[1] Exclusive of coke and scrap iron.

The blast consisted of 600 c.f.m. of air, to which 3½% additional oxygen was added, resulting in a total of approximately 650 c.f.m. Lead bullion was continuously tapped, while slag was tapped intermittently.

The carbon monoxide and carbon dioxide levels in the exhaust gases were checked throughout the production period, and a correlation was made between the $CO/CO_2$ ratio and the production rate. The data taken was as follows:

| Time | $CO/CO_2$ ratio | Production period | Lead output (tons) |
|---|---|---|---|
| 9:00 a.m. | .27 | 8:00 a.m.–10:00 a.m. | 5.3 |
| 11:00 a.m. | .28 | 10:00 a.m.–12 noon | 5.3 |
| 1:00 p.m. | .02 | 12 noon–2:00 p.m. | 3.2 |
| 3:00 p.m. | .13 | 2:00 p.m.–4:00 p.m. | 4.0 |

The low $CO/CO_2$ ratio at 1:00 P.M. was the result of a high sulfur content material in the charge. This resulted in a rapid fall-off in production. To correct the condition, each charge increment added to the furnace between 1:00 P.M. and 3:00 P.M. included an extra 5 lb. addition of scrap iron. As can be seen from the above table, by 3:00 P.M. the $CO/CO_2$ ratio was beginning to approach the low side of the range of the present invention, and the lead output had increased substantially.

Example III

The charge increments and furnace in this example were the same as set forth in Example II. The following data was taken, which shows the effects of change in the oxygen enrichment level in the blast upon the $CO/CO_2$ ratio.

| Time | Blast rate | $CO/CO_2$ ratio | Production period | Load output (tons) |
|---|---|---|---|---|
| 9:00 a.m. | 600 c.f.m. +3½% $O_2$ enrichment. | 0.25 | 8:00 a.m.-10:00 a.m. | 5.4 |
| 11:00 a.m. | 600 c.f.m. +3% $O_2$ enrichment. | 0.33 | 10:00 a.m.-12 noon | 4.6 |
| 1:00 p.m. | 600 c.f.m. +2½% $O_2$ enrichment. | 0.42 | 12 noon-2:00 p.m. | 3.7 |

As the above data indicates, changes in oxygen enrichment level to the blast have only a minor effect upon the $CO/CO_2$ ratio. This is particularly true, as in the instant case, where this ratio is rising because of a chemical unbalance in the charge resulting from a higher than normal level of charge impurities. Changing the level of oxygen enrichment can, however, be used alone or in combination with changes in scrap iron additions as an effective means of obtaining a finer control of the $CO/CO_2$ ratio within narrow limits.

What is claimed is:

1. In a shaft-type furnace process for the secondary production of lead from a charge consisting of lead bearing materials, fluxing material, carbonaceous material and ferrous bearing materials, wherein an oxidizing gas is reacted with said carbonaceous material to liberate the heat required in said process to melt and cause chemical reactions to take place among the charged materials, the improvement comprising (1) measuring the relative amounts of carbon monoxide and carbon dioxide present in the exhaust gases liberated during said process, and thereafter (2) regulating the proportion of said charge materials in such manner as to maintain the ratio of said carbon monoxide to carbon dioxide in the exhaust gases within the range of a minimum value of 0.15 to a maximum value of 0.30 by increasing the proportion of ferrous scrap material in the charge when said ratio falls below said minimum value, and decreasing the proportion of ferrous scrap material in the charge when said ratio exceeds said maximum value.

2. The process of claim 1 wherein the ratio of carbon monoxide to carbon dioxide in the exhaust gases is maintained within the range of 0.20 to 0.25.

3. The process of claim 1 wherein the desired ratio of carbon monoxide to carbon dioxide is maintained by adding additional ferrous scrap material to the charge whenever the ratio of carbon monoxide to carbon dioxide in the exhaust gases falls below 0.15, and reducing the charge of ferrous scrap material whenever said ratio exceeds 0.30.

4. The process of claim 2 wherein the desired ratio of carbon monoxide to carbon dioxide is maintained by adding additional ferrous scrap material to the charge whenever the ratio of carbon monoxide to carbon dioxide in the exhaust gases falls below 0.20, and reducing the charge of ferrous scrap material whenever said ratio exceeds 0.25.

5. The process of claim 1 wherein an increase in said ratio of CO to $CO_2$ above 0.30 is corrected by both decreasing the amount of ferrous scrap material added to the charge and increasing the percentage of oxygen in said oxidizing gas, in order to maintain said ratio within the range of 0.15 to 0.30.

6. In a shaft-type furnace process for the secondary production of lead from a charge consisting of lead bearing materials, fluxing material, carbonaceous material and ferrous bearing materials, wherein an oxidizing gas is reacted with said carbonaceous material to liberate the heat required in said process to melt and cause chemical reactions to take place among the charged materials, the improvement comprising (1) measuring the relative amounts of carbon monoxide and carbon dioxide present in the exhaust gases liberated during said process, and thereafter (2) regulating proportion of said oxidizing gas in such manner as to maintain the ratio of said carbon monoxide to carbon dioxide in the exhaust gases within the range of a minimum value of 0.15 to a maximum value of 0.30 by utilizing air enriched with oxygen as said oxidizing gas and by increasing the percentage of oxygen enrichment whenever said ratio exceeds said maximum value and by reducing said percentage of oxygen enrichment whenever said ratio falls below said minimum value.

References Cited

UNITED STATES PATENTS

| | | | |
|---|---|---|---|
| Re. 18,930 | 8/1933 | Davis | 75—63 X |
| 1,804,054 | 5/1931 | Hayward | 75—63 X |
| 1,882,571 | 10/1932 | Hamlin | 75—65 |
| 2,816,022 | 12/1957 | Morgan et al. | 75—77 X |

L. DEWAYNE RUTLEDGE, *Primary Examiner.*

HENRY W. TARRING II, *Assistant Examiner.*

U.S. Cl. X.R.

75—65, 77